United States Patent Office 3,525,629
Patented Aug. 25, 1970

3,525,629
STERILIZATION OF MILK
Frank V. Kosikowski, Ithaca, N.Y., assignor to Cornell Research Foundation, Inc., Ithaca, N.Y., a corporation of New York
Filed Oct. 29, 1965, Ser. No. 505,694
Int. Cl. A23c 3/00
U.S. Cl. 99—212                                                      10 Claims

ABSTRACT OF THE DISCLOSURE

A method of purifying a fluid food containing bacteria and other microorganisms harmful to its consumption as a food product and the product quality where the bacteria have a higher density than the fluid food product, by passing the fluid food product through a centrifugal separating means, separating the fluid product into a first component substantially free of bacteria and a second component containing these bacteria plus a subcomponent of the original fluid having substantial food value, the second component being more dense than said first component, sterilizing the second component and returning the component into fluid mixture with the first component for use as a food.

---

Figure 1:
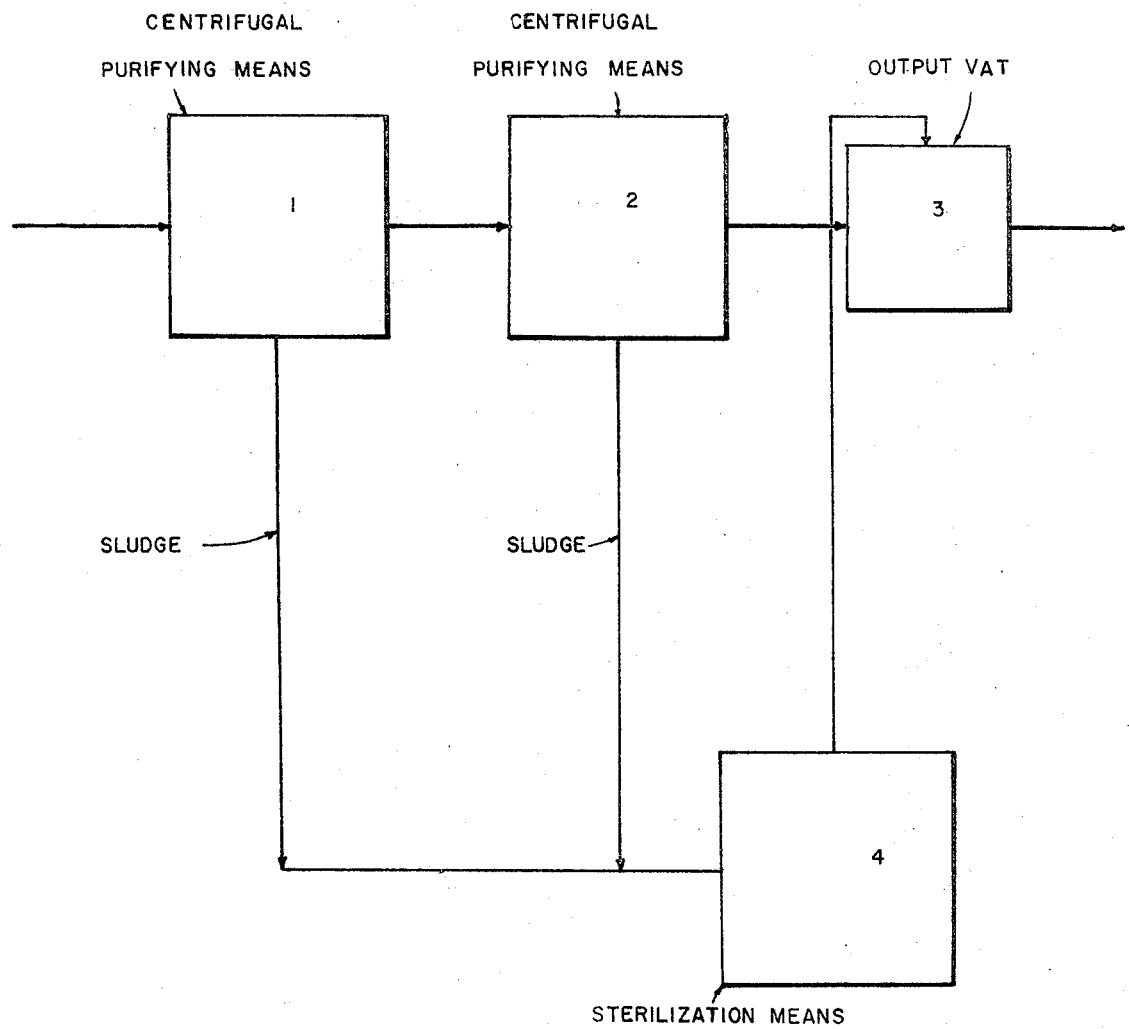

This invention relates to improvements in the processing of fluid food products and, more particularly, to improvements in the method of sterilizing a fluid food product which is being subjected to centrifugal purification techniques.

Fluid food products such as milk often contain bacteria which is harmful or potentially harmful and undesirable with respect to its consumption as a food product and the product quality. The undesired bacteria in fluid food products is typically removed from the product in several alternative ways. One method of sterilization or destruction is commonly known as pasteurization wherein the fluid is raised to a pasteurization temperature and held there for a temperature-time relationship which assures killing of the bacteria. Another method is to add a chemical such as hydrogen peroxide to milk which kills the bacteria in the milk, followed by an additional treatment of the milk to remove the unused and residual hydrogen peroxide. Still another way of sterilizing or removing undesired bacteria in fluid food products is by passing that fluid through a centrifugal purifying means wherein the bacteria being more dense are separated from the milk (and fat) or fluid serum by the appropriate application of gravity forces.

The present invention is particularly related to improvements in the method of sterilization wherein centrifugal purifying apparatus is used. Moreover, the teachings of the present invention have their most significant application where the centrifugal purifying approach is selected over the pasteurization and chemical additive approaches because the ultimate food product is detrimentally effected in some of its qualities by substantial reliance on those two methods.

For example, when milk is being purified to be utilized in cheesemaking, the raising of the milk for sterilizing purposes to pasteurization temperatures for the required time period functions to adversely effect the flavor of the cheese. Similarly, the addition of hydrogen peroxide to sterilize milk prior to its use in cheesemaking results in a chemical flavoring of the cheese and an adverse effect on its texture or body. Moreover, the United States Federal Food & Drug Administration places severe limitations on how much hydrogen peroxide may be added to milk intended for cheesemaking. At best one state specifically forbids cheesemakers to utilize hydrogen peroxide in milk being processed. This is also true of several countries of the world.

With respect to the centrifugal method, apparatus has been developed which improves the functioning of the centrifugal method in removing bacteria from the milk being processed. Pat. No. 3,058,833, issued Oct. 16, 1962, to Paul Simonart is illustrative of such improvemenets. In apparatus of this type the milk is passed through and subjected to centrifugal forces which separate the milk into a milk serum and fat component substantially free of harmful bacteria and a second sludge-like component containing substantially all of the harmful, deleterious, and undesired bacteria. The sludge-like component, moreover, contains approximately 2.5% of the original milk input. Accordingly, 2.5% of the input milk is lost in the centrifugation operation. However, even more serious is that the sludge-like component which is extracted from the usable milk contains much free protein, about 12%. Accordingly, although the centrifugal purifying or sterilizing method has potential in that it may be used to avoid raising the milk to a pasteurization level for the time period (or alternatively avoids the necessity of adding hydrogen peroxide to the milk), it has the detriments of reducing the milk by a percentage during each stage of centrifugation and, even more importantly, it subtracts from that milk a very desirable protein subcomponent.

Accordingly, it is a primary object of the present invention to provide a new and improved method of sterilizing or purifying a fluid food product by removing harmful or undesirable bacteria using a centrifugation purifying step.

It is another object of the present invention to provide a new and improved method of sterilizing or purifying milk by removing the undesired or harmful bacteria by centrifuging out the dense bacteria in the form of a sludge without significantly modifying the percentage of usable milk and, at the same time, not losing a relatively dense protein subcomponent.

It is an additional object of the present invention to provide a new improved means for sterilizing or purifying milk for cheesemaking in a manner such that substantially all of the bacteria is removed, while at the same time a very small percentage of the milk being processed is sterilized by conventional pasteurization and chemical additive techniques.

Briefly, these and other objects of the present invention are provided by passing the fluid food product through a centrifugal separating means separating the fluid product into a first component substantially free of bacteria and other microorganisms and a second component sludge-like in nature containing substantially all of said bacteria plus at least one valuable subcomponent of the original fluid having substantial food value wherein said second component is more dense than the first component. Then sterilizing the second component and returning it into fluid mixture with the first component for further use in food processing. The sterilization of the second component may be accomplished by conventional pasteurization or chemical additive techniques.

Other objects of the present invention will be apparent to those skilled in the art upon study of the accompanying disclosure and the drawing in which the figure shows a block diagram illustrating the process steps.

Referring again to the figure there is shown two centrifugal purifying means 1 and 2 connected in series. Assuming a fluid food product such as milk to be processed, the milk is first passed through centrifugal means 1 and then through centrifugal means 2 in a manner shown in the prior art. While two centrifugal means are shown, this number is merely illustrative and one or more than two may be used depending on the precise design requirements of a particular processing system.

Each centrifugal means (assuming proper design) functions to separate the milk into two components on the basis of difference in density. Specifically, the potentially harmful, deleterious and unwanted bacteria of the input milk have a higher density than the milk serum and most of the fat of the input milk. Accordingly, one component comprising a large part of the milk serum and fat passes out of separating means 1 in liquid form to the input of separating means 2. Whereas the other component leaves separating means 1 in sludge-like form by a separate route, as shown, and includes a high proportion of the bacteria and other microorganisms.

The output from the separating means 1 is then passed through separating means 2 again separating the milk into two components as aforesaid. By the time that the milk has passed through two centrifugal means, as shown, substantially all of the bacteria is removed from the output milk in that excess of 90 percent of the bacteria is in the sludge-like output from means 1 and 2. In the prior art the component comprising milk serum and fat which passes through the centrifugal separating means (herein shown as means 1 and 2) is passed on into an output container 3 where it is utilized in further processing a food product (cheese for example). In the prior art the sludge was not used.

Furthermore, in the prior art the milk entering the centrifugal purifying means is often preheated to a temperature below pasteurization temperature for an appropriate time to modify the milk so that the centrifuging operation is optimum. For example, the centrifugal purifying operation can be practiced with milk at a temperature where the input milk is raised to 130° F., held for 15 seconds and then passed through the centrifuging means 1 and 2 at this temperature. Moreover, means 1 and 2 may be of a hermetic bacterial centrifuge type D3187M manufactured by the De Laval Separator Company of Poughkeepsie, N.Y. In handling milk as aforesaid these machines may be operated at 1,500 r.p.m. and at a centrifugal force of 9,000 G. According to the prior art teachings one would operate in accordance with the above configuration when it was desired to reduce the bacteria content of a fluid product such as milk but it was undesirable to obtain a sterilized product by either raising the fluid being processed to pasteurization temperature or to treat the fluid being processed by a chemical additive.

One problem in operating as aforesaid in accordance with the prior art is that the sludge-like component taken from the centrifuge separating means 1 and 2 contains approximately 2.5% of the original fluid or milk input and that percentage of the input milk is lost in the resulting product. Moreover, an even more serious problem is that the sludge-like component which is extracted from the input fluid often contains a valuable subcomponent of the fluid. For example, in milk this sludge contains much free protein which may range as high as about 12% of the protein.

Accordingly, although the centrifugal purifying or sterilizing method described herein as prior art has potential in that it may be used to avoid either pasteurization or the addition of a chemical for sterilization in the processing of milk, it has the detriments of reducing the milk by a percentage during each stage of centrifugation and, even more important, it subtracts from that milk a very desirable protein subcomponent.

It is the essence of the present invention to sterilize the sludge and return it to the output of the centrifugation stages as shown in the figure by blocks 4 and 3. Block 4 illustrates the sterilization step and block 3 illustrates the return of the sterilized sludge into fluid mixture for further processing in accordance with the particular application of the process. Cheesemaking is one of the uses in which the teachings of the present invention would have substantial advantage. Once the sterilized sludge is returned to fluid mixture with fluid component of milk serum and fat, the cheesemaking would follow a conventional process.

Pasteurization of the sludge by raising its temperature to a sufficient level for a sufficient time period to kill substantially all of the bacteria in the sludge is not a detriment to the flavor of the ultimate product, such as cheese, because only a small proportion of the fluid mixture has been subjected to those temperatures. One sterilizing temperature and time period which has been used successfully for milk in cheesemaking is 165° F. for one minute. The pasteurization of the sludge can be accomplished by conventional techniques.

According to the teachings of the present invention the sludge may alternatively be sterilized by adding thereto a quantity of hydrogen peroxide by following conventional techniques in this regard. For example, following the addition of the hydrogen peroxide (dilute with tap water on 1:1 basis), sludge containing hydrogen peroxide is heated to 130° F. for about 16 seconds by conventional means. This is followed by the addition of an enzyme catalase for the purpose of causing any residual hydrogen peroxide to decompose into water and oxygen. The catalase is allowed to remain in contact with the milk for approximately 20 minutes or until a test such as a potassium iodine qualitative test indicates that no hydrogen peroxide remains. The sterilized sludge is then returned to the centrifuge output product thereby returning to the fluid mixture the valuable subcomponent such as protein in milk and the normal loss herein attributed to the prior art technique is minimized.

The hydrogen peroxide used for sterilization must be of the electrolytic type.

Because the chemical additive, hydrogen peroxide, as an example, is used to treat only the sludge and not the total output fluid, its effect upon the taste and texture or body of the final food product is minimal or nonexistent. For example, cheese made of a milk processed in this manner does not have a chemical flavoring nor is its texture or body adversely effected. Moreover, the various government regulations concerning the use of hydrogen peroxide become less stringent on a percentage basis. For example, less hydrogen peroxide is needed in milk processing than heretofore possible.

As a reasonable alternative another method for solving the problem of loss in the process is to place a pasteurized substance into fluid mixture with the first component containing at least the valuable subcomponent lost through centrifugation. While the above invention has been described in terms of milk it should be understood that other fluids such as fluid eggs having similar qualities might well also be processed by the teachings of the present invention.

I claim:
1. A method of processing germ-containing liquids which comprises centrifuging the liquid to separate a small sludge portion thereof enriched with germs from the remainder of the liquid, sterilizing said separated small sludge portion of the liquid enriched with germs, and thereafter remixing said separated and sterilized portion with said remainder of the liquid.

2. A method of processing germ-containing liquids which comprises centrifuging the liquid to separate a small sludge portion thereof enriched with germs from the remainder of the liquid, pasteurizing said separated small sludge portion of the liquid enriched with germs, and thereafter remixing said separated and pasteurized portion with said remainder of the liquid.

3. The method of purifying a fluid containing bacteria and other microorganisms harmful to its consumption as a food product and the product quality where said bacteria have a higher density than the fluid food product, comprising passing the fluid food product through a centrifugal separating means, separating the fluid product into a first component substantially free of bacteria and a second sludge-like component containing these bacteria plus a subcomponent of the original fluid having substantial food value, said second component being more dense than said first component, sterilizing said second component and returning said component into fluid mixture with said first component for use as a food.

4. The method of purifying a fluid containing bacteria and other microorganisms harmful to its consumption as a food product and the product quality where said bacteria have a higher density than the fluid food product, comprising passing the fluid food product through a centrifugal separating means, separating the fluid product into a first component substantially free of bacteria and a second sludge-like component containing these bacteria plus a subcomponent of the original fluid having substantial food value, pasteurizing said second component, placing said pasteurized substance containing the valuable subcomponent lost through centrifugation into fluid mixture with the said first component.

5. The method of processing milk containing bacteria and other microorganisms harmful to its consumption as a food product or harmful to the quality of the food, comprising passing the milk through a centrifugal separating means separating the milk into a milk serum and fat component as one part substantially free of said bacteria and a sludge-like component as the other part, containing substantially all said bacteria plus a subcomponent comprising desirable protein, said sludge-like component being more dense than said milk serum and fat component, sterilizing said sludge-like component and then returning the sterilized sludge into fluid mixture with said milk serum component for use as a food.

6. The method of claim 5 wherein the sterilizing step comprises raising the sludge-like component to pasteurization temperature for a time period commensurate with the pasteurization of the sludge-like component and using the recombined sludge-like component and milk serum and fat component to produce a food following conventional techniques.

7. The method of claim 5 wherein the sterilizing step comprises arising the sludge-like component to pasteurization temperature for a time period commensurate with the pasteurization of the sludge-like component and using the recombined sludge-like component and milk serum and fat component to produce a cheese following conventional techniques.

8. The method of claim 5 wherein the sterilization step comprises treating the sludge-like component by adding thereto hydrogen peroxide of the electrolytic process type, waiting a sufficient time for the hydrogen peroxide to destroy the bacteria and other microorganisms, removing the excess hydrogen peroxide by the addition to the sludge of an enzyme catalase, waiting a sufficient time period for the residual hydrogen peroxide to decompose into water and oxygen, and using the final fluid mixture of the milk serum and fat component and the sterilized sludge component to produce a food following conventional techniques.

9. The method of claim 5 wherein the sterilization step comprises treating the sludge-like component by adding thereto hydrogen peroxide of the electrolytic process type, waiting a sufficient time for the hydrogen peroxide to destroy bacteria and other microorganisms, removing the excess hydrogen peroxide by the addition to the sludge of an enzyme, catalase, waiting a sufficient time period for the residual hydrogen peroxide to decompose into water and oxygen, and using the final fluid mixture of the milk serum and fat component and the sterilized sludge component to produce a cheese following conventional techniques.

10. The method of claim 5, wherein the step of sterilizing the sludge includes first killing the bacteria and then clarifying the sludge.

References Cited

UNITED STATES PATENTS 2,847,310  8/1958  Turnbow _____ 99—212 X

FOREIGN PATENTS 18,724  12/1904  Germany.

LIONEL M. SHAPIRO, Primary Examiner

D. M. NAFF, Assistant Examiner

U.S. Cl. X.R.
99—211; 210—78